US012658612B2

(12) United States Patent
Jarosch et al.

(10) Patent No.: US 12,658,612 B2
(45) Date of Patent: Jun. 16, 2026

(54) SPLICE TERMINAL AND METHOD FOR MAKING A SPLICE ARRANGEMENT

(71) Applicant: NEXANS, Courbevoie (FR)

(72) Inventors: Amanda Jarosch, Weiden (DE); Helmut Steinberg, Störnstein (DE)

(73) Assignee: NEXANS, Courbevoie (FR)

(*) Notice: Subject to any disclaimer, the term of this patent is extended or adjusted under 35 U.S.C. 154(b) by 288 days.

(21) Appl. No.: 18/239,107

(22) Filed: Aug. 28, 2023

(65) Prior Publication Data

US 2024/0079798 A1 Mar. 7, 2024

(30) Foreign Application Priority Data

Sep. 1, 2022 (EP) .................................... 22306300

(51) Int. Cl.
*H01R 11/12* (2006.01)
*H01R 43/033* (2006.01)

(52) U.S. Cl.
CPC ........... *H01R 11/12* (2013.01); *H01R 43/033* (2013.01)

(58) Field of Classification Search
CPC .............................. H01R 11/12; H01R 43/033
See application file for complete search history.

(56) References Cited

U.S. PATENT DOCUMENTS

| | | | | |
|---|---|---|---|---|
| 6,338,649 | B1 * | 1/2002 | Smith | H01R 11/282 439/504 |
| 7,351,123 | B1 | 4/2008 | Winiecke | |
| 2012/0093472 | A1 * | 4/2012 | Hsing | H02G 15/1833 385/135 |
| 2021/0091486 | A1 * | 3/2021 | Vuillardot | H01R 11/12 |

FOREIGN PATENT DOCUMENTS

| | | |
|---|---|---|
| CN | 108 461 160 | 8/2018 |
| FR | 2 882 196 | 8/2006 |
| JP | 2020 021680 | 2/2020 |

OTHER PUBLICATIONS

International Search Report dated Feb. 2, 2023.

* cited by examiner

*Primary Examiner* — Sean Gugger
(74) *Attorney, Agent, or Firm* — Sofer & Haroun, LLP

(57) ABSTRACT

A splice arrangement for a plurality of electric lines is provided. Each electric line has a conductor, an insulating sheath, and a cable shoe fixed to one end of the respective conductor of each line. The splice arrangement has a connection bolt composed of a shaft and a head and is provided with at least one spring contact fixed to the shaft for engaging with one or several of the cable shoes to establish an electrical connection between the plurality of electric lines.

4 Claims, 5 Drawing Sheets

SPLICE TERMINAL AND METHOD FOR MAKING A SPLICE ARRANGEMENT

RELATED APPLICATION

This application claims the benefit of priority from European Patent Application No. 22 306 300.9, filed on Sep. 1, 2022, the entirety of which is incorporated by reference.

FIELD

The present disclosure relates to a splice terminal and a method for making a splice arrangement, in particular for unshielded electric lines.

BACKGROUND

In modern vehicles, such as electric cars, there are numerous electrical and electronic devices and components, which in many cases need to share the same electrical potential on some contacts or lines, for instance ground or a certain reference voltage. Thus, there exists a corresponding need for connecting a plurality of electrical lines. The number of lines to be connected can reach for example from 3 to lines or more.

EP 3 451 463 A1 discloses a splice for shielded lines that connects the conductors of three lines at connection points as well as the screens of the lines. The conductors of the lines are connected to a contact piece, e.g. by ultrasonic welding or soldering. To that end, the lines are put into a fixture allowing a worker to manually connect the conductors. The manual work makes the manufacturing of such a splice more expensive than the production of a connection that is made by an automated machine. But until present automated production of splices involving a connection of a plurality of conductors to a contact piece is not available. Apart from relatively high production costs another problem of the known splice is that the required installation space is large compared to simpler types of contacts.

Low voltage lines in a vehicle do not have a screen. A splice for such unshielded lines can therefore be simpler in construction compared to the splice disclosed in EP 3 451 463 A1 because there is no need to also contact the screens of the lines. However, known solutions of unshielded lines still require manual work and are comparatively bulky. The required size of installation space can be particularly disturbing for low voltage lines transferring only low power with an accordingly thin conductor. In such lines of the ratio of the radius of the conductor to the thickness of the insulating sheath decreases with decreasing diameter of the conductor. In other words: The decrease of diameter of the conductor does not entail a corresponding decrease of the diameter of the line because of the sheath remains at a minimum thickness to protect the line against frictional wear.

This situation is illustrated in FIGS. 8A and 8B. FIG. 8A shows a cross-section of a first line 801 with a conductor 802 and a sheath 803. The conductor 802 has a diameter d1 and the insulating sheath has a thickness S1. The diameter of the line 801 is D1.

FIG. 8B illustrates a cross-section of the second line 806 with a conductor 807 and sheath 808. The conductor 807 has a diameter d2 and the insulating sheath 808 is a thickness of S2. The diameter d2 is approximately 5 times smaller than the diameter d1 of line 801 while the thickness S2 of the sheath 808 is approximately two thirds of the thickness S1 of the first line 801. The diameter of the line 806 is D2. Since the thickness S2 of the sheath 808 does not decrease in proportion to the decrease of the diameter d2 of the conductor 807, the diameter D2 of the line 806 is still approximately one third of the diameter D1 of the line 701 even though the conductor of the line 806 is only ⅕ of the diameter d1 of the conductor 802 of the line 801.

This examples of the FIGS. 8A and 8B demonstrate that the relative importance of installation space required to accommodate the insulating sheaths of unshielded low voltage lines increases with decreasing diameters of the conductors.

In view of this there remains a desire to provide for a splice for thin unshielded lines which requires only a small installation space and can be manufactured with automated manufacturing machines.

SUMMARY

According to a first aspect the present disclosure suggests a splice arrangement for a plurality of electric lines. Each electric line comprises a conductor, an insulating sheath, and a cable shoe fixed to one end of the respective conductor of each line. The cable shoe comprises a through hole. The splice arrangement comprises a connection bolt composed of a shaft and a head and is provided with at least one spring contact fixed to the shaft for engaging with one or several of the cable shoes to establish an electrical connection between the plurality of electric lines.

The cable shoes can be placed by a machine onto the connection bolt enabling an automated manufacturing process for the splice arrangement. In addition to that, an angular offset of the connected lines leads to a compact design of the splice arrangement.

According to an advantageous embodiment, the head of the connection bolt has a diameter that is bigger than the diameter of the shaft of the connection bolt. The head forms a shoulder offering an abutment for the cable shoes which are placed on the shaft of the connection bolt.

Advantageously, the at least one spring contact is arranged at a predefined distance from the head. The distance equals the thickness of the cable shoe multiplied by the number of cable shoes mounted on the connection bolt. Thus, no manual work is required to establish an electrical contact between the connected lines which lowers production costs.

In an alternative embodiment the connection bolt comprises a plurality of spring contacts which are arranged in angular direction of the shaft of the connection bolt at equal angular distances around the circumference of the shaft and in axial direction of the shaft at a distance that essentially equals the thickness of one of the cable shoes. This alternative embodiment of the splice arrangement permits to use a single connection bolt for a variable number of lines to be connected.

In the case of the alternative embodiment of the splice arrangement it has been found useful when each cable shoe has a recess adjacent to the through hole of the cable shoe. The recess is dimensioned to accommodate a spring contact without actuating the spring contact. The cable shoes are adapted to cooperate with the connection bolt having a plurality of spring contacts at different axial positions on the connection bolt.

According to a second aspect the present disclosure suggests a method for manufacturing a splice arrangement according to the first aspect of the present disclosure. The method comprises holding a connection bolt in a fixture;

putting terminal lugs of the lines to be connected onto the connection bolt;

placing a shrinking hood over the connection bolt and the lines on the connection bolt; and heating the shrinking hood.

The method allows for a cost-efficient automatic manufacturing of splice arrangements for unshielded electric lines.

Advantageously the method further comprises aligning the recess of a currently mounted terminal lug such that the spring contact of the previous terminal lug is not actuated by the currently mounted terminal lug. According to this variant it is possible to put the plurality of terminal lugs onto the connection bolt wherein each terminal lug is contacted individually by a spring contact. The terminal lugs are provided with a recess that accommodates the spring contact of a previously mounted terminal lug if the recess is properly aligned. In this way a subsequent terminal lug does not actuate the spring contact of the previously mounted terminal lug.

Further advantages of the present disclosure supposedly become apparent when reading the following detailed description.

BRIEF DESCRIPTION OF THE DRAWINGS

Exemplary embodiments of the present disclosure are illustrated in the drawings and are explained in more detail in the following description. In the figures, the same or similar elements are referenced with the same or similar reference signs. It shows.

In the figures the same or similar components are labelled with the same or similar reference signs.

DETAILED DESCRIPTION

Figure 1:
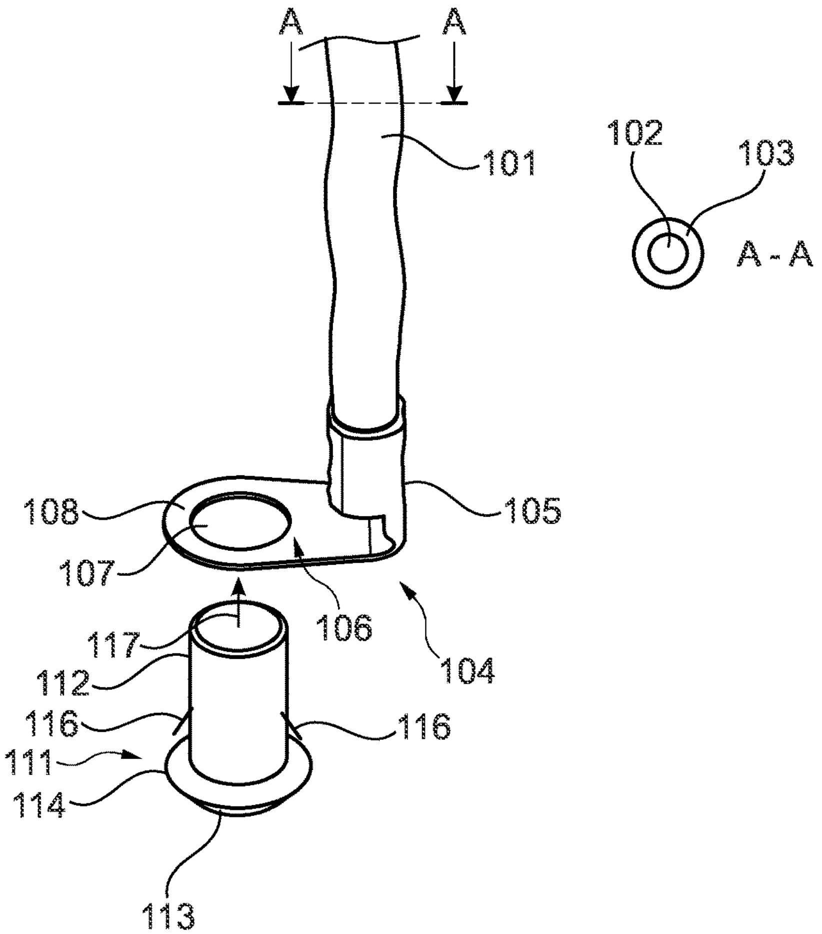
FIG. 1 a connection bolt and an unshielded electric line with a cable shoe.

FIG. 1 shows an unshielded single core electric line 101 with a stranded wire conductor 102 surrounded by an insulating sheath 103. At one end of the line 101 the sheath 103 is removed and a cable shoe 104 is mechanically and electrically connected to the conductor 102 by a crimp sleeve 105. The cable shoe 104 further comprises a terminal lug 106 including a through hole 107 surrounded by a rim 108. The terminal lug 106 is bent by 90° relative to a longitudinal axis of the line 101.

Next to the line 101, FIG. 1 displays a connection bolt 111 comprising a shaft 112 and a head 113. The diameter of the head 113 is bigger than the diameter of the shaft 112. The head forms a shoulder 114 offering an abutment for the cable shoe 104 if placed on the shaft 112 of the connection bolt 111. The size of the through hole 107 is adapted to receive the shaft 112 of the connection bolt but does not allow the passage of the head 113. The shaft 112 further carries spring contacts 116 that can be deflected by the rim 108 when the connection bolt 111 is pushed through the through hole 107 of the terminal lug 106 as it is indicated by arrow 117. In the embodiment shown in FIG. 1 there are only two spring contacts 116 which are arranged at opposing positions on the shaft 112 of the connection bolt 111. In other embodiments there is only one spring contact or more than two spring contacts distributed around the circumference of the shaft 112. The connection bolt 111 is made from copper, bronze or any other suitable electrically conducting material. The spring contacts 116 are made for instance from spring bronze or another elastic and electrically conducting material.

Figure 2:
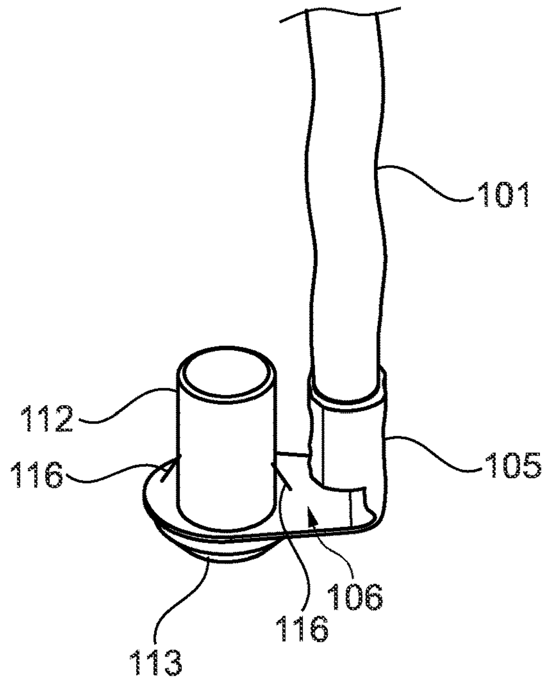
FIG. 2 the connection bolt of FIG. 1 inserted into the cable shoe of the electric line.

FIG. 2 illustrates the connection bolt 111 inserted into the through hole 107 of the cable shoe 104 in its end position. As it can be taken from FIG. 2, the connection bolt 111 allows for accepting a plurality of terminal lugs 106 because the thickness of the terminal lugs 106 is thinner than the length of the distance between a free end of the spring contacts 116 and the shoulder 114 of the connection bolt 111.

Figure 3:
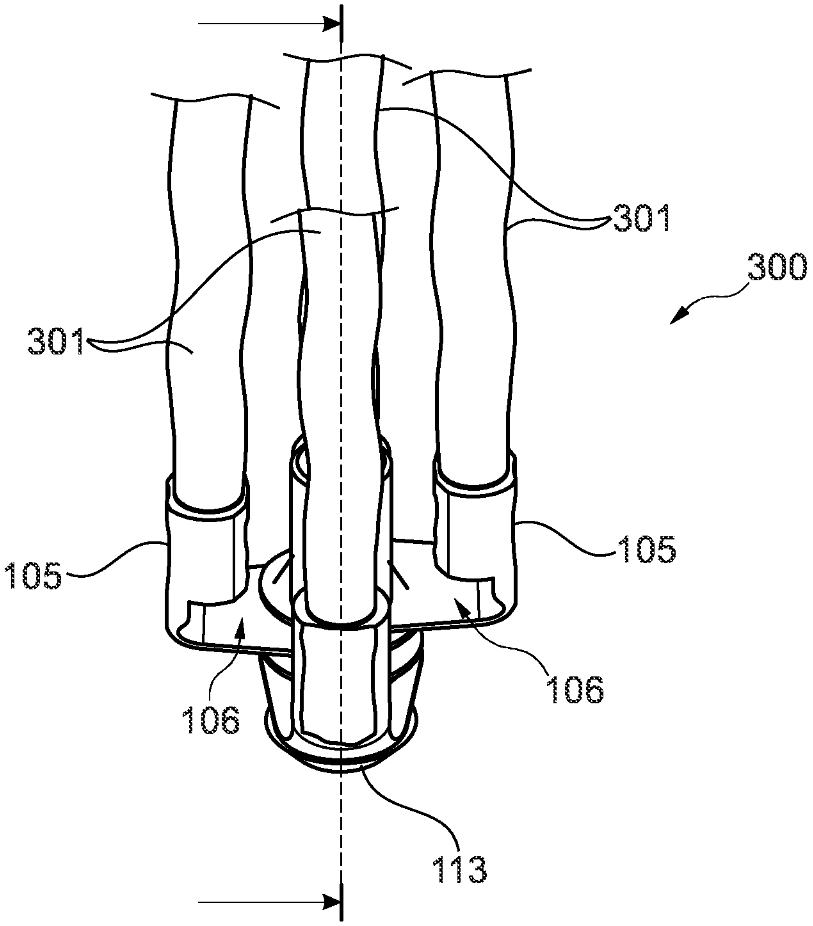
FIG. 3 a splice arrangement according to the present disclosure.

FIG. 3 displays a perspective view of an embodiment of a splice arrangement 300 according to the present disclosure including four lines 301 connected to the connection bolt 111. The four lines 301 are offset from one another in circumferential direction by an azimuth angle of 90°. In case of other embodiments having 5, 6 etc. lines connected to the connection bolt 111, their azimuth angle offset would be reduced to 72°, 60° etc.

All terminal lugs 106 are pressed together by the spring contacts 116 arranged on the shaft 112 of the connection bolt 111. The spring contacts are arranged at an axial position on the shaft 112 such that the distance between the shoulder 114 formed by the head 113 of the connection bolt 111 and a free end of the spring contacts 116 (not visible in FIG. 3) corresponds to the cumulative thickness of the terminal lugs 106 that are placed on the connection bolt 111. The offset in angular direction of the connected lines 301 reduces the required installation space and enables a compact design of the splice arrangement 300.

Figure 4:
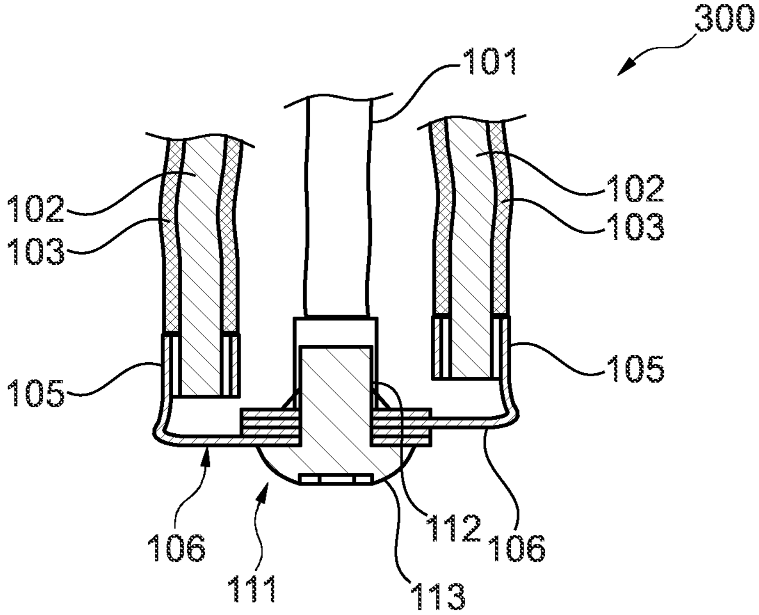
FIG. 4 a cross-section of the splice arrangement of FIG. 3.

FIG. 4 shows a cross-sectional view of the splice arrangement 300 of FIG. 3. The terminal lugs 106 of the lines 301 are arranged next to each other and pressed together by the spring contacts 116. In this way a firm mechanical contact is achieved that secures at the same time a good electrical connection between all connected lines 301. FIG. 4 also illustrates that the length of the connection bolt 111 and/or the axial position of the spring contacts 116 on the connection bolt 111 is chosen according to the number of terminal lugs 106 and the thickness of the terminal lugs 106, which are placed on the connection bolt 111.

Figure 5:
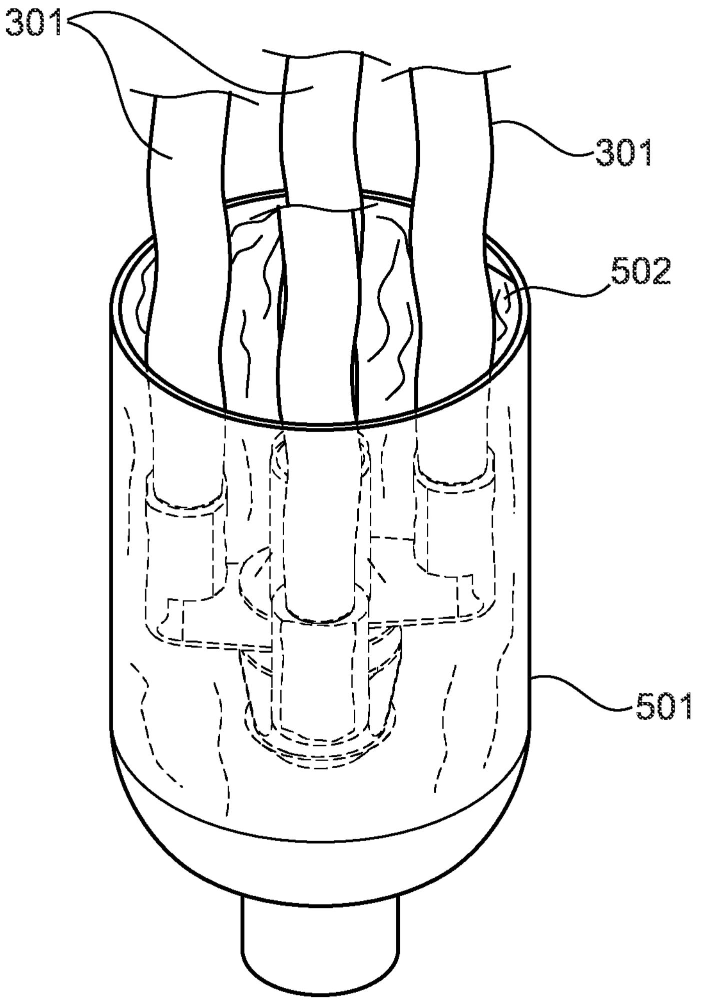
FIG. 5 the splice arrangement of FIG. 3 with a shrinking hood.

In practical applications the splice arrangement 300 needs to be insulated and protected against environmental influences, especially against humidity. This is achieved by a shrink hood 501 which is placed over the splice arrangement 300 as shown in FIG. 5. The shrink hood 501 contains inside a thermoplastic glue 502 that melts when the shrink hood 501 is heated. When heated, the shrink hood 501 reduces its diameter and the molten thermoplastic glue flows into all intermediate spaces between the lines 301. In this way the contact area of the terminal lugs 106 and the connection bolt 111 is hermetically separated from the environment.

Figure 6A:
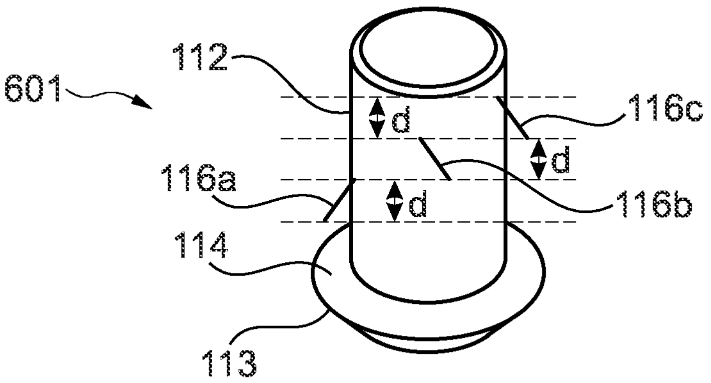
FIG. 6A an alternative connection bolt.

FIG. 6A displays an alternative connection bolt 601. Like connection bolt 111, the connection bolt 601 comprises a shaft 112 in the head 113. However, connection bolt 601 provides for one spring contact 116 for each terminal lug 106 to be connected with the connection bolt 601. Specifically, the connection bolt 601 is provided with four spring contacts 116_a-d_ located at equidistant angular positions around the circumference of the shaft 112. Hence, there is an angular offset of 90° between each one of the spring contacts 116_a-d_. (It is noted that the spring contact 116_d_ is not visible in FIG. 6A.) The first spring contact 116_a_ is attached to the shaft 112 of the connection bolt 601 such that a free end of the spring contact 116_a_ contacts a terminal lug 106 put onto the connection bolt 601. The distance of the free end of the spring contact 116_a_ and the shoulder 114 of the head 113 is d, which corresponds to the thickness of the terminal lug 106. The second spring contact 116_b_ is offset by 90° in circumferential direction from the first spring contact 116_a_ and has a distance of 2d from the shoulder 114. This allows for contacting a second terminal lug 106 which is put onto the connection bolt 601. Furthermore, the third spring contact 116_c_ is offset by 90° in circumferential direction from the second spring contact 116_b_ and has a distance of 3d from the shoulder 114. Finally, the fourth spring contact 116_d_ (not visible in FIG. 6A) is offset by 90° in circumferential direction from the third spring contact 116_c_ and has a distance of 4d from the shoulder 114. In this way it is possible to put four terminal lugs 106 onto the connection bolt 601 and each terminal lug is mechanically fixed and electrically connected by one of the spring contacts 116_a-d_. The spring contacts 116_a-d_ are illustrated in FIG. 6A only schematically.

Figure 6B:
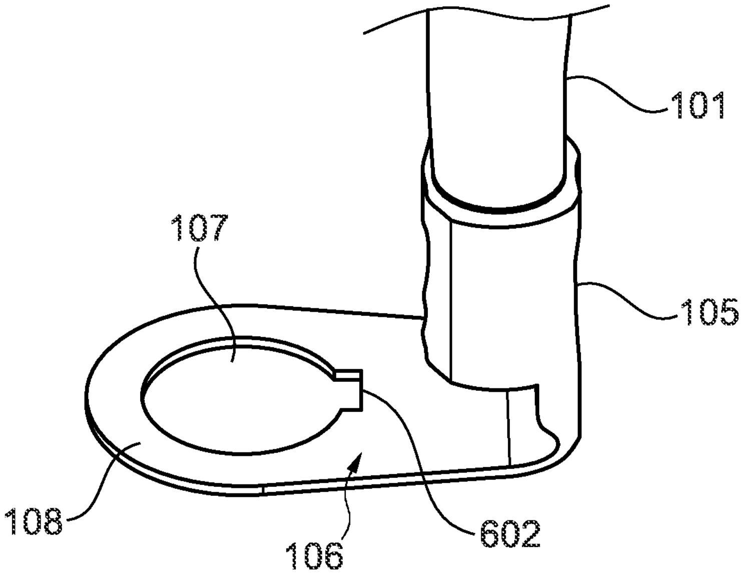
FIG. 6B an adapted cable shoe for the alternative connection bolt of FIG. 6A.

In order to avoid that a spring contact is bent by a a terminal lug 106 subsequently put onto the connection bolt 601, each terminal lug is provided with a recess 602 through which a preceding spring contact can pass without being actuated by the subsequent terminal lug. The modified terminal lug 106 is shown in FIG. 6B.

Figure 7:
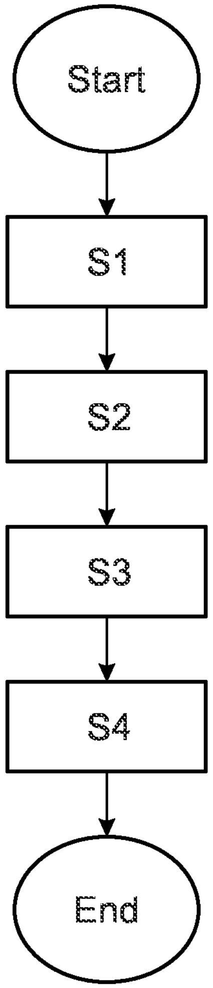
FIG. 7 a flow diagram of a method for manufacturing the splice arrangement.
Figure 8A:
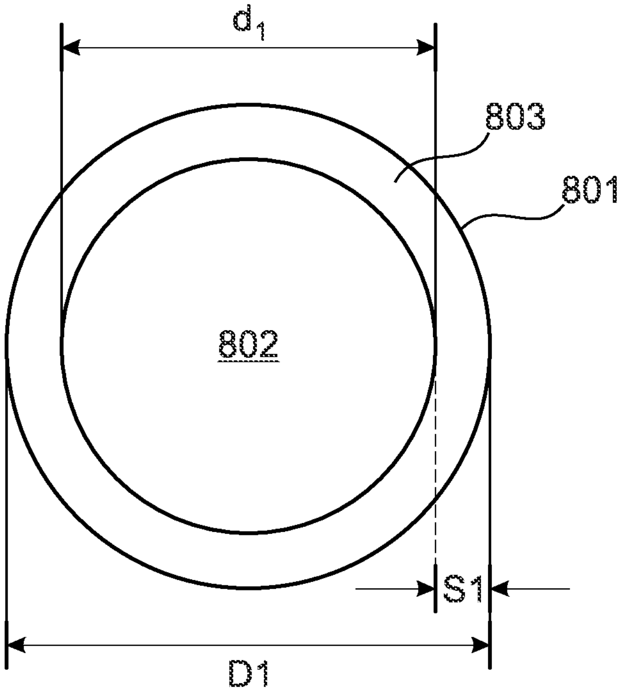
FIGS. 8A, 8B single core electrical lines of different diameters.
Figure 8B:
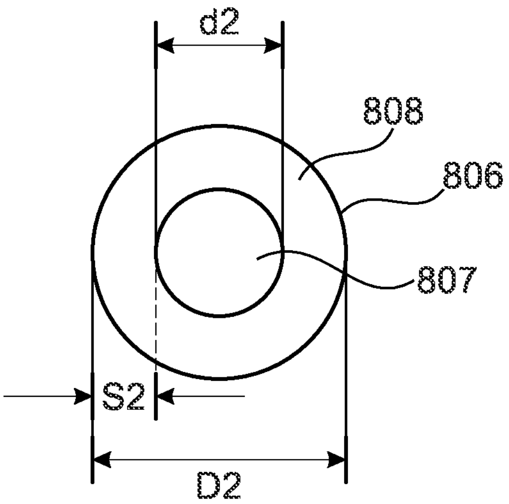

FIG. 7 illustrates the flow diagram of a method for producing the splice arrangement 300. For the sake of brevity, the method is described in conjunction with the connection bolt 111.

In a first step S1 a connection bolt 111 is selected and held in a fixture in a machine. The connection bolt 111 is adapted to the number of lines to be connected with the connection bolt 111. In step S2 the terminal lugs of the lines 101 are put onto the connection bolt 111. When the terminal lug 106 of the last line 101 is fixed on to the connection bolt 111, the shrinking hood 501 is placed over the splice arrangement 300 in step S3. In step S4 the shrinking hood 501 is heated to hermetically encapsulate the splice arrangement 300.

In case of a splice arrangement utilizing a connection bolt 601 step S2 includes positioning the terminal lugs 106 such that the spring contact of the previous terminal lug is not actuated by the subsequent terminal lug. This is achieved by properly aligning the recess 602 with the spring contact of the previously mounted terminal lug.

Individual components or functionalities of the present invention are described in the embodiment examples as software or hardware solutions. However, this does not mean that a functionality described as a software solution cannot also be implemented in hard-ware and vice versa. Similarly, mixed solutions are also conceivable for a person skilled in the art, in which components and functionalities are simultaneously partially realized in software and hardware.

In the claims, the word "comprising" does not exclude other elements or steps, and the indefinite article "a" does not exclude a plurality.

LIST OF REFERENCE SIGNS

101 Line
102 Conductor
103 Sheath
104 Cable shoe
106 Terminal lug
107 Through hole
108 Rim
111 Connection bolt
112 Shaft
113 Head
114 Shoulder
116 Spring contact
117 Arrow
300 Splice arrangement
301 Lines
501 Shrinking hood
502 Thermoplastic glue
601 Connection bolt
602 Recess
801 Line
802 Conductor
803 Sheath
806 Line
807 Conductor
808 Sheath

The invention claimed is:

1. A splice arrangement for a plurality of electric lines, wherein each line has a conductor, an insulating sheath, and a cable shoe fixed to one end of the respective conductor of each line, wherein each cable shoe comprises at least one terminal lug including a through hole, said splice arrangement comprising:

a connection bolt composed of a shaft and a head which is configured to offer an abutment for the cable shoes;

a plurality of spring contacts fixed to the shaft for pressing the cable shoes towards the head to establish an electrical connection between the plurality of electric lines, wherein the plurality of spring contacts are positioned on the shaft at equal intervals in an axial direction of the shaft and at a predefined distance from the head and adjacent spring contacts, respectively, wherein the predefined distance essentially equals the thickness of a terminal lugs mounted on the connection bolt, wherein the plurality of spring contacts arranged in angular direction of the shaft of the connection bolt at equal angular distances around the circumference of the shaft, wherein the arrangement of the plurality of spring contacts in axial and circumferential direction on the shaft of the connection bolt enables an automated manufacturing process for the splice arrangement.

2. The splice arrangement according to claim 1, wherein the head of the connection bolt has a diameter that is bigger than the diameter of the shaft of the connection bolt.

3. The splice arrangement according to claim 1, wherein each terminal lug has a recess adjacent to the through hole of the terminal lug, wherein the recess is dimensioned to accommodate a spring contact of the plurality of spring contacts without actuating the spring contact.

4. A method for manufacturing a splice arrangement, for a plurality of electric lines, wherein each line has a conductor, an insulating sheath, and a cable shoe fixed to one end of the respective conductor of each line, wherein each cable shoe comprises at least one terminal lug including a through hole said splice arrangement having a connection bolt composed of a shaft and a head which is configured to offer an abutment for the cable shoes;

a plurality of spring contacts fixed to the shaft for pressing the cable shoes towards the head to establish an electrical connection between the plurality of electric lines, wherein the plurality of spring contacts are positioned on the shaft at equal intervals in an axial direction of the shaft and at a predefined distance from the head and adjacent spring contacts, respectively, wherein the predefined distance essentially equals the thickness of a terminal lug mounted on the connection bolt, wherein the plurality of spring contacts arranged in angular direction of the shaft of the connection bolt at equal angular distances around the circumference of the shaft, wherein each terminal lug has a recess adjacent to the through hole of the terminal lug, wherein the recess is dimensioned to accommodate a spring contact of the plurality of spring contacts without actuating the spring contact wherein the arrangement of the plurality of spring contacts in axial and circumferential direction on the shaft of the connection bolt enables an automated manufacturing process for the splice arrangement, said method for manufacturing the spice arrangement comprising the steps of:

holding the connection bolt in a fixture;

putting a number of the terminal lugs of the lines to be connected onto the connection bolt such that each spring contact presses on the terminal lugs towards the head of the connection bolt to establish an electrical connection between the plurality of electric lines;

aligning the recess of a currently mounted terminal lug such that the spring contact of the previous terminal lug is not actuated by the currently mounted terminal lug;

placing a shrinking hood over the connection bolt and the lines on the connection bolt; and heating the shrinking hood.

* * * * *